United States Patent
Chiang

(10) Patent No.: US 11,170,757 B2
(45) Date of Patent: Nov. 9, 2021

(54) SYSTEMS AND METHODS FOR IMPROVED CALL HANDLING

(71) Applicant: T-Mobile USA, Inc., Bellevue, WA (US)

(72) Inventor: Hsin-Fu Henry Chiang, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 307 days.

(21) Appl. No.: 15/281,875

(22) Filed: Sep. 30, 2016

(65) Prior Publication Data

US 2018/0096676 A1   Apr. 5, 2018

(51) Int. Cl.
*G06F 3/0482* (2013.01)
*G10L 13/08* (2013.01)
(Continued)

(52) U.S. Cl.
CPC ............ *G10L 13/08* (2013.01); *G06F 3/0482* (2013.01); *G06F 3/04817* (2013.01);
(Continued)

(58) Field of Classification Search
CPC .......... G06F 17/30902; G06F 3/04817; G06F 3/0482; G06F 3/04886; G06F 3/04847;
(Continued)

(56) References Cited

U.S. PATENT DOCUMENTS 5,500,919 A * 3/1996 Luther ................ G06F 3/167
                                                    704/260
5,850,629 A * 12/1998 Holm ................. G06F 3/16
                                                    704/260
(Continued)

FOREIGN PATENT DOCUMENTS

CN          101334996 A     12/2008
CN          101965266 A      2/2011
(Continued)

OTHER PUBLICATIONS

PCT Search Report and Written Opinion dated Dec. 22, 2017 for PCT Application No. PCT/US17/51191, 17 pages.
(Continued)

*Primary Examiner* — Phenuel S Salomon
(74) *Attorney, Agent, or Firm* — Lee & Hayes, P.C.

(57) ABSTRACT

Systems and methods for sending text messages in audio form over voice calls. When a user receives an incoming voice call, the system can enable a user to type a "text" message to the caller. Rather than being sent as a text message, however, the system can send the text message directly to the microphone of the user's equipment (UE) as a voice synthesized audio file, or text-to microphone (TTM) message. The audio file is then sent from the user's UE to the caller's UE, in effect "reading" the text message to the caller. The caller hears the contents of the message, in the form of a voice synthesized audio file over the speaker of the caller's UE. The system can mute the microphones on one or both UEs during the TTM process to create a virtually silent process from the user's standpoint.

19 Claims, 8 Drawing Sheets

(51) Int. Cl.
  *G06F 3/0481*    (2013.01)
  *G06F 3/0488*    (2013.01)
  *G06F 3/0484*    (2013.01)
  *H04W 4/12*      (2009.01)
  *H04M 3/42*      (2006.01)
  *G10L 13/00*     (2006.01)

(52) U.S. Cl.
  CPC ...... *G06F 3/04847* (2013.01); *G06F 3/04886* (2013.01); *G10L 13/00* (2013.01); *H04M 3/42382* (2013.01); *H04W 4/12* (2013.01); *H04M 2201/39* (2013.01); *H04M 2203/651* (2013.01)

(58) Field of Classification Search
  CPC ........ G06F 16/182; G06F 3/167; G06F 17/28; G06F 21/36; G06F 17/277; G06F 17/289; G06F 3/038; G06F 3/04812; G06F 8/425; G06F 8/427; G06F 16/24575; G06F 16/3344; G06F 16/338; G06F 16/60; G06F 16/90335; G06F 3/0481; G06F 3/04842; G06F 16/90332; G06F 16/9038; G06F 3/048; G06F 3/0488; G06F 3/147; G10L 13/08; H04M 2201/39; H04M 2203/651; H04M 3/42382; H04M 3/5166; H04M 3/5191; H04M 2203/551; H04M 15/83; H04M 2201/42; H04M 1/72552; H04M 3/493; H04M 7/006; H04M 2203/253; H04M 3/4938; H04M 2201/40; H04M 7/0054; H04M 1/04; H04W 4/12; H04L 67/02; H04L 41/0803; H04L 27/2647; H04L 51/18; H04L 69/18; H04L 61/106; H04L 67/2819

See application file for complete search history.

(56) References Cited

U.S. PATENT DOCUMENTS

| | | | | |
|---|---|---|---|---|
| 5,933,804 A * | 8/1999 | Huang | ............. | G10L 15/063 704/244 |
| 6,453,281 B1 * | 9/2002 | Walters | ............. | G06F 3/0481 704/200 |
| 6,490,550 B1 * | 12/2002 | Hiri | ............. | H04M 7/006 375/E7.025 |
| 6,507,735 B1 * | 1/2003 | Baker | ............. | H04M 3/53 455/412.1 |
| 6,546,082 B1 * | 4/2003 | Alcendor | ............. | H04Q 3/0029 379/52 |
| 6,570,966 B1 * | 5/2003 | Freeman | ............. | H04M 11/068 379/52 |
| 6,621,892 B1 * | 9/2003 | Banister | ............. | H04L 51/066 379/88.14 |
| 6,628,763 B1 * | 9/2003 | Mani | ............. | H04Q 3/0016 379/142.08 |
| 6,763,089 B2 * | 7/2004 | Feigenbaum | ............. | G09B 21/00 379/52 |
| 6,870,914 B2 * | 3/2005 | Bossemeyer | ............. | H04M 3/428 379/142.06 |
| 7,047,192 B2 * | 5/2006 | Poirier | ............. | G10L 15/34 704/235 |
| 7,058,036 B1 * | 6/2006 | Yu | ............. | H04L 51/066 370/335 |
| 7,555,521 B1 * | 6/2009 | McLaughlin | ............. | H04L 51/04 379/88.17 |
| 7,643,619 B2 * | 1/2010 | Jung | ............. | G08B 6/00 379/52 |
| 7,672,436 B1 * | 3/2010 | Thenthiruperai | . | H04M 1/72552 379/88.04 |
| 7,706,510 B2 * | 4/2010 | Ng | ............. | H04M 1/72552 379/88.14 |
| 7,890,330 B2 * | 2/2011 | Ozkaragoz | ............. | G10L 13/06 434/156 |
| 7,986,978 B2 * | 7/2011 | Katoh | ............. | H04M 1/72513 379/211.01 |
| 8,285,547 B2 * | 10/2012 | Koinuma | ............. | G06F 3/16 381/56 |
| 8,583,093 B1 * | 11/2013 | Bort | ............. | H04M 1/65 379/88.13 |
| 8,774,845 B1 * | 7/2014 | Kalamkar | ............. | H04L 51/066 455/466 |
| 9,094,811 B1 * | 7/2015 | Rosen | ............. | H04M 3/5116 |
| 9,225,833 B1 * | 12/2015 | Koster | ............. | H04M 3/5175 |
| 9,226,121 B2 * | 12/2015 | Koum | ............. | H04W 4/12 |
| 9,230,549 B1 * | 1/2016 | Popik | ............. | H04L 51/36 |
| 9,288,165 B1 * | 3/2016 | Stovall | ............. | G06Q 50/01 |
| 9,558,756 B2 * | 1/2017 | Wohlert | ............. | G10L 21/02 |
| 9,626,955 B2 * | 4/2017 | Fleizach | ............. | G10L 13/043 |
| 9,629,185 B1 * | 4/2017 | Gluckman | ............. | H04W 4/90 |
| 9,992,642 B1 * | 6/2018 | Rapp | ............. | H04W 4/14 |
| 2001/0014860 A1 * | 8/2001 | Kivimaki | ............. | G10L 13/04 704/260 |
| 2002/0046030 A1 * | 4/2002 | Haritsa | ............. | H04M 3/5232 704/255 |
| 2002/0077158 A1 * | 6/2002 | Scott | ............. | H04M 1/663 455/567 |
| 2002/0181671 A1 | 12/2002 | Logan | | |
| 2003/0093300 A1 * | 5/2003 | Denholm | ............. | G06F 3/0219 705/2 |
| 2003/0097262 A1 * | 5/2003 | Nelson | ............. | H04M 1/72522 704/235 |
| 2003/0157968 A1 * | 8/2003 | Boman | ............. | H04M 1/72547 455/563 |
| 2004/0208168 A1 | 10/2004 | Masuda | | |
| 2004/0267527 A1 * | 12/2004 | Creamer | ............. | G10L 19/0018 704/235 |
| 2005/0117564 A1 * | 6/2005 | Vieri | ............. | G10L 13/00 370/352 |
| 2005/0141680 A1 * | 6/2005 | Tucker | ............. | H04M 1/6505 379/88.18 |
| 2005/0149328 A1 * | 7/2005 | Huang | ............. | G06F 3/0237 704/252 |
| 2006/0095331 A1 * | 5/2006 | O'Malley | ............. | G06F 17/30902 705/22 |
| 2006/0098792 A1 | 5/2006 | Frank et al. | | |
| 2006/0116142 A1 * | 6/2006 | Cofta | ............. | H04L 51/24 455/466 |
| 2006/0120343 A1 * | 6/2006 | O'Brien | ............. | H04L 12/1859 370/351 |
| 2006/0199554 A1 * | 9/2006 | Kwon | ............. | H04B 1/3805 455/142 |
| 2006/0224386 A1 * | 10/2006 | Ikegami | ............. | G10L 13/00 704/260 |
| 2006/0271521 A1 * | 11/2006 | Denoue | ............. | G06F 3/0481 |
| 2007/0230374 A1 * | 10/2007 | Altberg | ............. | H04M 7/0036 370/271 |
| 2008/0159489 A1 * | 7/2008 | Xu | ............. | H04M 1/575 379/88.12 |
| 2008/0168050 A1 * | 7/2008 | Reyes | ............. | G06F 3/038 |
| 2009/0022285 A1 * | 1/2009 | Swanburg | ............. | H04M 7/0033 379/88.11 |
| 2009/0024759 A1 * | 1/2009 | McKibben | ............. | G08B 27/005 709/238 |
| 2009/0030755 A1 * | 1/2009 | Altberg | ............. | G06Q 30/02 705/7.34 |
| 2009/0048821 A1 * | 2/2009 | Yam | ............. | G06F 3/04842 704/3 |
| 2009/0113279 A1 * | 4/2009 | Monro | ............. | G11B 27/034 715/202 |
| 2009/0249244 A1 * | 10/2009 | Robinson | ............. | G06F 3/04842 715/781 |
| 2010/0002685 A1 * | 1/2010 | Shaham | ............. | H04M 3/002 370/352 |
| 2010/0087180 A1 * | 4/2010 | Wilson | ............. | H04L 51/38 455/418 |
| 2010/0169096 A1 * | 7/2010 | Lv | ............. | H04L 51/04 704/260 |

(56) References Cited

U.S. PATENT DOCUMENTS

| | | | |
|---|---|---|---|
| 2010/0261508 A1* | 10/2010 | Chang | G06F 3/1454 455/566 |
| 2011/0068915 A1* | 3/2011 | Wakefield, III | G01S 5/0009 340/539.13 |
| 2011/0111805 A1* | 5/2011 | Paquier | H04M 1/72552 455/563 |
| 2011/0173267 A1* | 7/2011 | Liu | G10L 13/00 709/206 |
| 2011/0184739 A1* | 7/2011 | May | H04M 1/6066 704/260 |
| 2011/0219080 A1* | 9/2011 | McWithey | H04L 67/18 709/206 |
| 2011/0301950 A1* | 12/2011 | Ouchi | G10L 15/28 704/231 |
| 2012/0069131 A1* | 3/2012 | Abelow | G06Q 10/067 348/14.01 |
| 2012/0182143 A1* | 7/2012 | Gaines | A61B 5/0022 340/539.12 |
| 2012/0244876 A1* | 9/2012 | Park | G06F 3/0489 455/456.1 |
| 2013/0040611 A1* | 2/2013 | Rega | H04M 1/72566 455/413 |
| 2013/0132854 A1* | 5/2013 | Raleigh | G06F 3/0482 715/738 |
| 2013/0212478 A1* | 8/2013 | Karr | G06F 3/167 715/727 |
| 2013/0297308 A1* | 11/2013 | Koo | G06F 3/167 704/235 |
| 2013/0310089 A1* | 11/2013 | Gianoukos | H04W 4/21 455/466 |
| 2014/0019135 A1* | 1/2014 | Talwar | G10L 13/08 704/260 |
| 2014/0024350 A1* | 1/2014 | Bouzid | G06F 9/44 455/414.1 |
| 2014/0122080 A1* | 5/2014 | Kaszczuk | G10L 13/04 704/260 |
| 2014/0129208 A1* | 5/2014 | Brown | G06F 17/289 704/3 |
| 2014/0156271 A1* | 6/2014 | Gammon | H04L 12/18 704/235 |
| 2014/0211669 A1* | 7/2014 | Park | H04M 3/42 370/271 |
| 2014/0368601 A1* | 12/2014 | deCharms | H04L 65/403 348/14.02 |
| 2015/0024715 A1* | 1/2015 | Kwon | H04M 1/72547 455/412.1 |
| 2015/0045003 A1* | 2/2015 | Vora | H04M 1/64 455/412.2 |
| 2015/0113044 A1* | 4/2015 | Noldus | H04L 65/1016 709/203 |
| 2015/0237203 A1* | 8/2015 | Siminoff | H04M 3/432 379/210.01 |
| 2015/0341481 A1 | 11/2015 | Kim et al. | |
| 2016/0014257 A1* | 1/2016 | He | G06Q 10/10 455/414.1 |
| 2016/0065711 A1 | 3/2016 | De Carney | |
| 2016/0139877 A1* | 5/2016 | Park | G06F 3/167 715/727 |
| 2016/0183069 A1* | 6/2016 | Wilson | H04W 4/14 455/466 |
| 2016/0205245 A1* | 7/2016 | Kim | H04M 1/576 455/414.1 |
| 2017/0188216 A1* | 6/2017 | Koskas | H04W 4/90 |
| 2018/0049086 A1* | 2/2018 | Bouvet | H04W 36/08 |
| 2018/0091643 A1* | 3/2018 | Singh | H04M 1/72569 |
| 2018/0255356 A1* | 9/2018 | Zhao | G06F 3/167 |

FOREIGN PATENT DOCUMENTS

| | | |
|---|---|---|
| CN | 103856626 A | 6/2014 |
| CN | 105210355 A | 12/2015 |
| KR | 1020160045057 | 4/2016 |

OTHER PUBLICATIONS

Partial supplementary European Search Report dated Feb. 28, 2020, for European Application No. 17857188.1, 13 pages.

Machine translated Chinese Office Action dated Mar. 17, 2021 for Chinese Patent Application No. 201780060499.7, a foreign counterpart to U.S. Appl. No. 15/281,875, 21 pages.

Extended European Search Report dated Jun. 23, 2020 for European Patent Application No. 17857188.1, 11 pages.

* cited by examiner

ABSTRACT# SYSTEMS AND METHODS FOR IMPROVED CALL HANDLING

BACKGROUND

Computers, cellular phones, and other electronic devices are ubiquitous. The combination of the Internet, cellular technologies, and modern electronics, among other things, has created an explosion in the number and types of electronic devices available (e.g., cellular phones, smart phones, tablets, laptops, etc.). Users rely on smart phones, for example, for internet access, e-mail, navigation, and even status.

Users are often in situations in which they cannot answer the phone or make a call. A user may be in an interview or an important meeting, for example, and be unable to answer or place a call. A user may simply be in a noisy location (e.g., a concert or construction site) in which they cannot hear and/or cannot be heard. Thus, while it may be important for the user to answer or make a voice call, they may nonetheless be unable to do so. In addition, in some situations, sending a text message may not solve the immediate problem because, for example, the caller may not look at the text message immediately and text messages are sometimes delayed in their transmission.

Similarly, it can be difficult for users with hearing, speech, or vision impairments to communicate with others using standard cell phone technologies. If a user with hearing calls a deaf user on a voice call, for example, the deaf user may have difficulty conveying the need to communicate via text to the hearing user. If the deaf user simply sends a text message to the hearing user, the hearing user may ignore the text because they are "on the phone." If the caller has vision impairment, on the other hand, text messaging may be of little use anyway.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
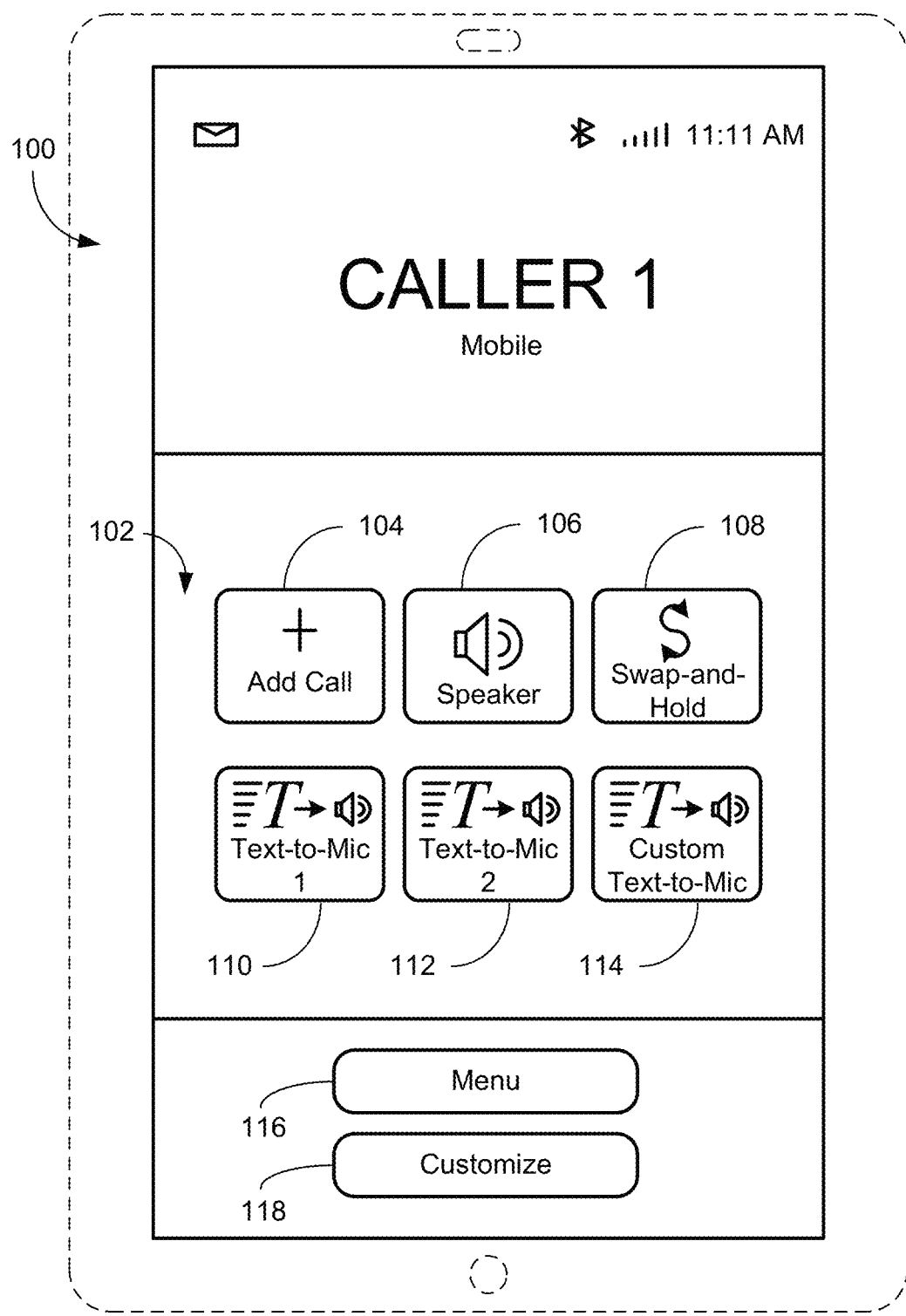
FIG. 1A depicts a graphical user interface (GUI) including text-to-microphone (TTM) buttons, in accordance with some examples of the present disclosure.

Examples of the present disclosure relate generally to systems and methods for providing audio "text" messages to callers from user equipment (UE) when the user is unable to talk on a call. The system can include a text message graphical user interface (GUI) that enables users to send regular text messages, direct "text-to-microphone" messages, or data packets containing audio messages. The text-to-microphone messages enable the user to type a text message, which is then read to the caller by a voice synthesizer module, or other device, via the speaker on the caller's UE instead of, or in addition to, appearing on the caller's screen.

To simplify and clarify explanation, the disclosure is described herein as systems and methods for use with cellular phones. One skilled in the art will recognize, however, that the disclosure is not so limited. While the systems and methods are useful in conjunction with cellular phones and messaging associated therewith, it should be understood that the systems and methods can just as easily be used for other connected electronic devices, such as tablets, laptops, and personal computers. The system can be used anytime text-over-voice communication is desired to provide the user with an enhanced communications and to enable the user additional call-handling options.

The manufacturing methods, materials, and systems described hereinafter as making up the various elements of the present disclosure are intended to be illustrative and not restrictive. Many suitable materials, systems, and configurations that would perform the same or a similar function as the systems described herein, are intended to be embraced within the scope of the disclosure. Such other systems and methods not described herein can include, but are not limited to, vehicles, systems, networks, materials, and technologies that are developed after the time of the development of the disclosure.

There are myriad situations in which a user may receive a call or wish to place a call, but be unable to do so. As mentioned above, the user may be in a loud or dangerous location, in a meeting, at church, or otherwise indisposed. Thus, while in some cases, a user may simply step out of a meeting to receive a call, for example, this is not always possible. It would be useful, therefore, to be able to convey to the caller that you are unavailable in a timely and caller-friendly manner.

In some situations, simply sending the caller to voicemail (VM) or sending a text may be acceptable. If the caller is a friend or family, for example, simply sending a text to the caller may be sufficient. If the call is urgent, on the other hand, or the user or caller is physically impaired, sending a text message may not suffice. Sending a text message to a visually impaired caller, for example, may serve little purpose. At the very least, it delays the communication process because the caller must find some way to decipher the message (e.g., using special text-to-voice software). The user may also wish to place a call to convey timely information to a recipient while they are still in a meeting, for example, or at a concert.

Thus, it would be useful to be able to communicate verbally with other callers, while remaining silent. In other words, if the user is in an interview or meeting, the user may be unable to talk on the phone, but would nonetheless like to communicate with other callers verbally (e.g., place or receive a call). The user may also prefer that no sounds emanate from the user's UE during this process.

To this end, examples of the present disclosure can comprise systems and methods for sending text-to-microphone (TTM) messages over voice calls. As the name implies, the TTM message can be entered by the user using the keyboard on the UE, or other suitable means. The TTM can then be translated by a voice synthesizing module and then transmitted to the speaker on the caller's UE as if the message had been spoken into the user's microphone. Thus, while the user has not spoken, the TTM is nonetheless "read" verbally to the caller. In some examples, an actual text message can be sent concurrently to appear on the caller's screen. This can provide some redundancy and may help to avoid confusion.

Reading the text message is useful in multiple ways. The caller is attempting to place a voice call, for example, and thus, is not expecting a text message. In other words, the caller is simply expecting the user to say "Hello," or similar, and may not check a text message right away ("I'm on a call, I'll check that later.") Thus, reading the text message to the caller responds to the caller in the manner they are expecting—verbally. In addition, the user can respond to the caller without making any noise. This can be useful in a meeting, at church, or in noisy environments, among other things.

In some examples, the TTM can be transmitted using the voice channel already in use for the voice call (i.e., the call initiated by the caller). In other examples, the microphones on both the caller's UE and the user's UE can be muted to prevent any extraneous sounds from being created on either UE. The TTM can be read on one or both UEs depending on the user's preferences. In some examples, the TTM can be read only on the caller's UE to enable the user to remain silent. As mentioned above, in some examples, a text message can accompany the TTM so that the caller receives both audio and visual versions of the message.

In some examples, the system can utilize real-time text (RTT) over the established voice call. In this configuration, the established voice call can be silenced (i.e., the microphone on the user's UE and/or the caller's UE are muted) and communication is performed via RTT. This enables the user and the caller to communication in real-time, with the TTM being generated essentially as typed. Of course, in some examples, some buffer may be useful to enable the voice synthesizing module to translate usable amounts of information into the TTM (i.e., a letter by letter audio message would be of limited utility).

In other examples, the system can utilize short messaging service (SMS) or rich communication services (RCS, or "chat") instead of, or in addition to, the voice call. In this configuration, the system can establish a voice call (either placed or received by the user), but then ask the recipient/caller to switch over to an SMS or RCS application. This may not provide the instant communication provided by RTT, but can be close to real-time depending on the network. In this case, because SMS and RCS do not utilize the voice channel, the voice call can optionally be ended and the conversation continued via SMS or RCS.

As shown in FIG. 1A, examples of the present disclosure can comprise a GUI 100 for providing TTM. The GUI 100 can comprise a number of function buttons 102 that enable the user to handle calls in a variety of ways. The add call button 104, speaker button 106, and swap-and-hold button 108 can have their usual functions. The add call button 104 can enable the user to add the incoming call to the current call to conduct a conference call with multiple callers. The speaker button 106 can place the current call on speaker phone. The swap-and-hold button can place the current call on hold and swap over to the incoming call without conferencing the two calls together.

The GUI 100 can also include one or more pre-configured TTM buttons 110, 112. As the name implies, these function buttons 110, 112 can enable the user to send a pre-configured text message to the incoming call. The user can configure these function buttons 110, 112 to include any suitable message that is, for example, relatively generic or useful in many situations. So, for example, the TTM 1 button 110 may read, "Thank you for your call. I apologize, but I am unavailable to take your call right now. I will call you back as soon as possible." The TTM 2 button 112 can be configured with a different, but similarly general message that may apply to multiple callers.

In some examples, the TTM 1 button 110 may include a more formal, or businesslike message, while the TTM 2 button 112 may be a more familiar message. Thus, the TTM 1 button 110 may say read as above, while the TTM 2 button 112 may read, "On a call, call you right back." Thus, the TTM 1 button 110 can be used for more formal, or business, communications, while the TTM 2 button 112 can be used for friends and family.

In some examples, the GUI 100 can also include a custom TTM button 114. The custom TTM button 114 can enable the user to send a personalized TTM message quickly without having to exit the call handling GUI 100 and open the text messaging utility separately. If none of the pre-configured TTM buttons 110, 112 are appropriate for a particular caller, for example, the user can press the custom TTM button 114 and type a text directly on the GUI 100. This can enable the user to type and send a TTM message more quickly and with little, or no, delay (or disruption to the current call, if applicable).

Regardless of which TTM button 110, 112, 114 is selected, the user has been verbally alerted that the user is not available, rather than simply sending the user to voicemail or sending a standard text message. This can avoid any confusion on the caller's part—i.e., listening for an answer, but receiving a text message—and can prevent the call from feeling neglected, among other things. In some examples, one of the preconfigured text messages can also include a reference to a return call—e.g., "I apologize, I am temporarily indisposed. I will call you back within the next 10 minutes. If you would like to be sent to voicemail, please press 1 now. Otherwise, I will return your call shortly."

In some examples, the GUI 100 can comprise any number of function buttons 102. If the number of functions exceeds the size of the GUI 100, a scrollbar, or similar, can be used to enable the user to access off-screen function buttons 102. In other examples, for convenience and efficiency, the GUI 100 may limit the number of function buttons 102 that can be displayed on a single screen. This can enable the user to access these function buttons 102 directly without accessing additional menus or scrollbars. As shown, the GUI 100 may limit the number of function buttons 102 to the four or six most appropriate function buttons 102.

Figure 1B:
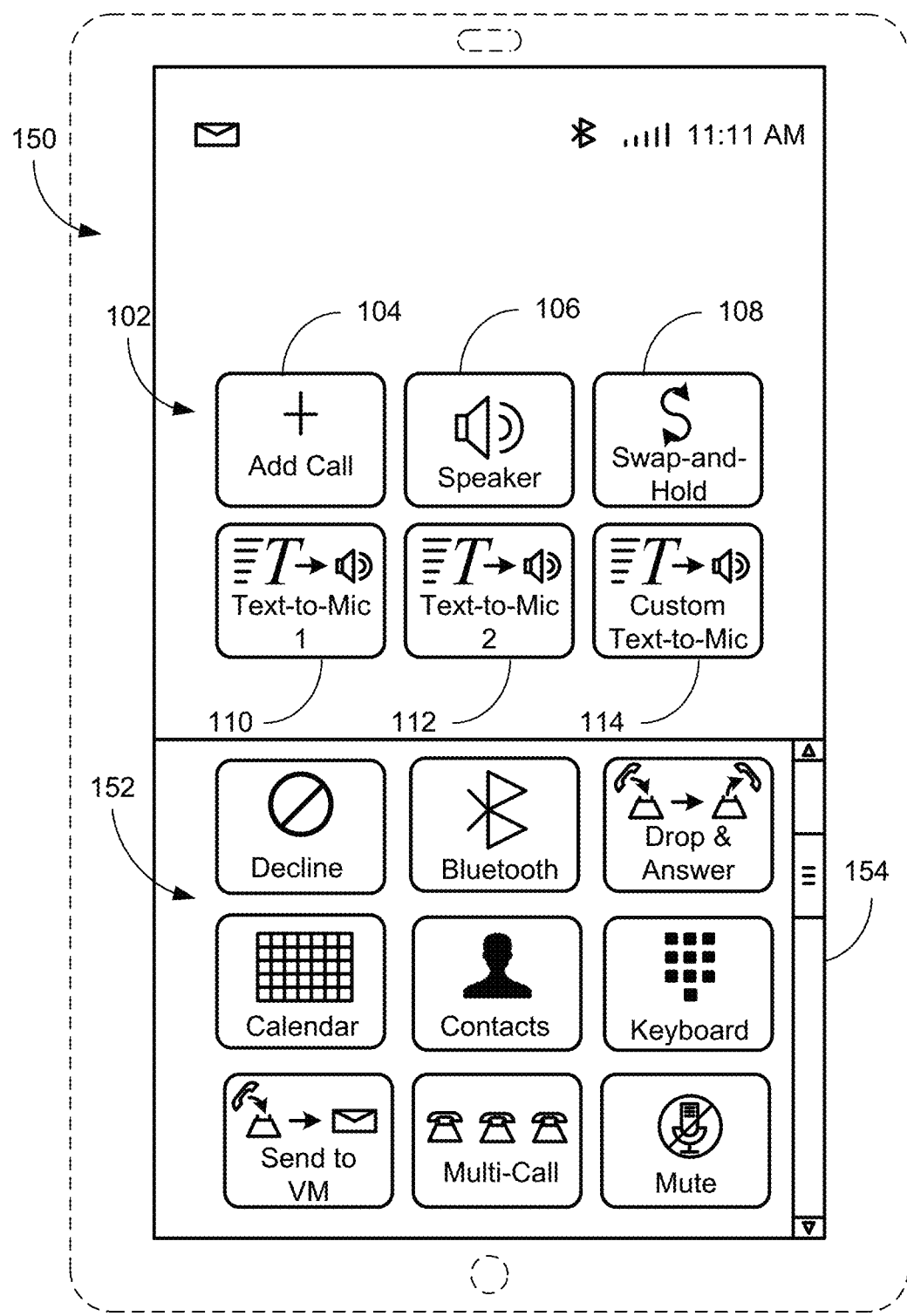
FIG. 1B depicts a menu graphical user interface (GUI) including additional function buttons, in accordance with some examples of the present disclosure.

The GUI 100 can also include a menu button 116. As shown in FIG. 1B, when the user selects the menu button 116, a menu GUI 150 can open making additional function buttons 152 available manually. The menu button 122 can enable the user to access additional menus, functions, or other features. As shown, the menu GUI 150 can include a number of additional function buttons 152 to enable the user to access additional features for handling the incoming call. This can provide more function buttons 102 than can be provided on a single screen, yet enable the user to access them quickly.

In some examples, the number of additional function buttons 152 can exceed the space available on the screen. As a result, in some examples, the menu GUI 150 can include a scroll bar 154, arrows, or other means to enable the user to access additional function buttons 152 that are off-screen. The menu button 116 can enable the user to access these additional function buttons 152 without permanently updating the configuration of the GUI 100.

Figure 2:
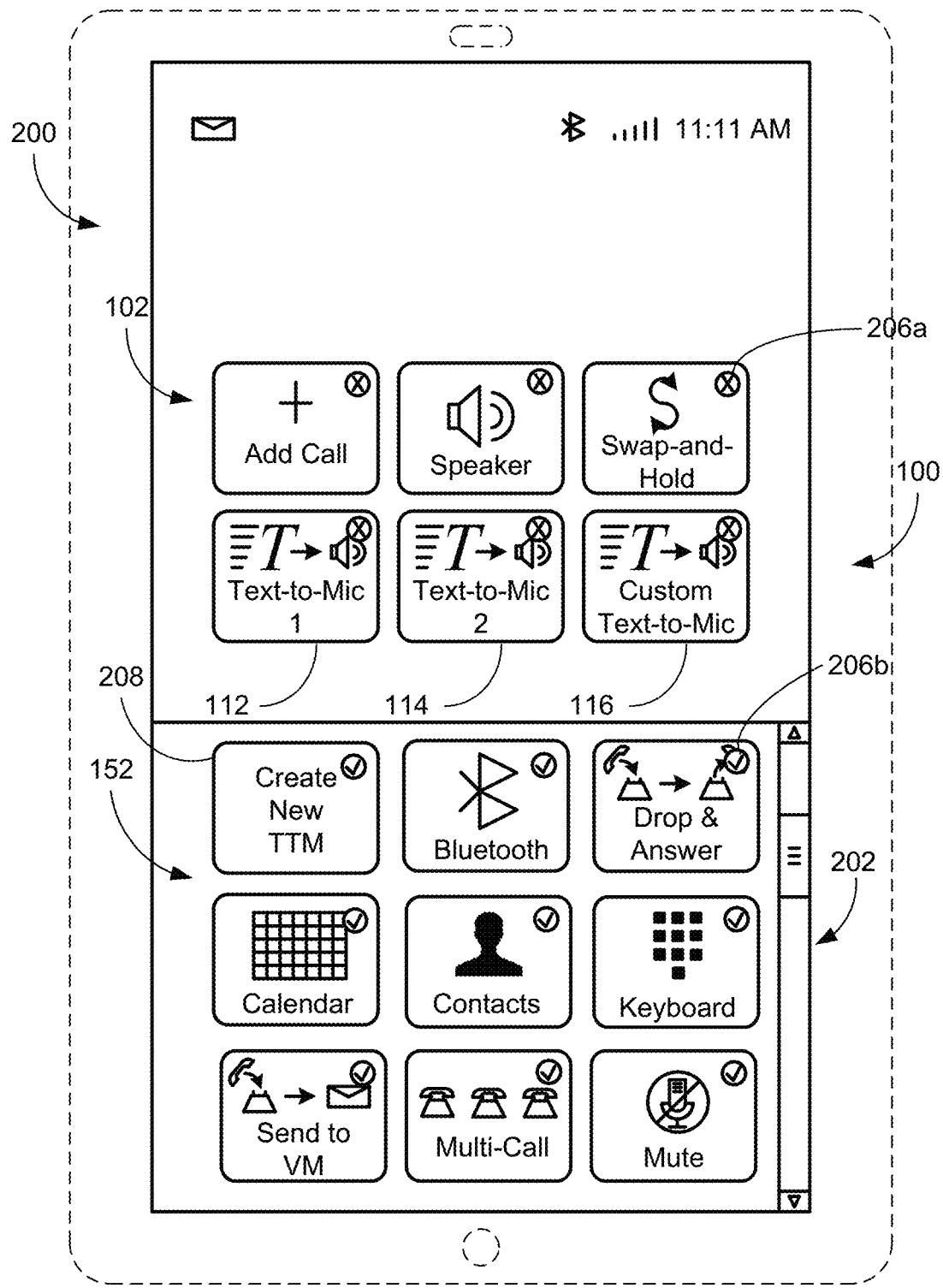
FIG. 2 depicts a customizing module for the GUI, in accordance with some examples of the present disclosure.

The customize button 118, on the other hand, can enable the user to update the default configuration of the GUI 100. As shown in FIG. 2, therefore, a customizing module 200 can be accessed by selecting the customize button 118 on the GUI 100. As the name implies, the customizing module 200 can enable at least the function buttons 102 of the GUI 100 to be customized. So, for example, the customizing module 200 can include the GUI 100 and a customizing menu 202 including a plurality of additional function buttons 152 (i.e., in addition to, and including, the functions that are included with the GUI 100 by default). Thus, the user can use the GUI 100 with the function buttons 102 that are chosen by default from the manufacturer or service provider, or can customize one, or all, of the function buttons 102 to suit their personal preferences.

In some examples, the function buttons 102, 152 can be added to, or removed from, to the GUI 100 using a selector button 206 or similar. The user can remove existing function buttons 102 by selecting a remove button 206a—shown as an "X" button, for example. The user can also add additional function buttons 152 to the GUI 100 by selecting the appropriate add button 206b—shown as a "checkmark" button.

Of course, the design, shape, and locations of the selector buttons 206 is somewhat arbitrary. Instead of selector buttons 206, the customizing module 200 could provide drag-and-drop functionality. In this configuration, the user can simply drag an existing function button 102 off the GUI 100 and into the customizing menu 202 to remove it. Similarly, the user can drag an additional function 152 from the customizing menu 202 to the GUI 100 to add it. The customizing menu 202 could also comprise an "add" and "remove" drop down menu, buttons, checklists, or other means to enable the user to add and remove function buttons 102, 152 as desired.

In some examples, the customizing module 200 can also include a create new TTM button 208. This can enable the user to update or reconfigure the pre-configured TTM buttons 110, 112 or create new pre-configured TTM buttons. As mentioned above, this can enable the user to quickly access and customize messages that are particularly useful to their business or personal calls, for example.

Figure 3:
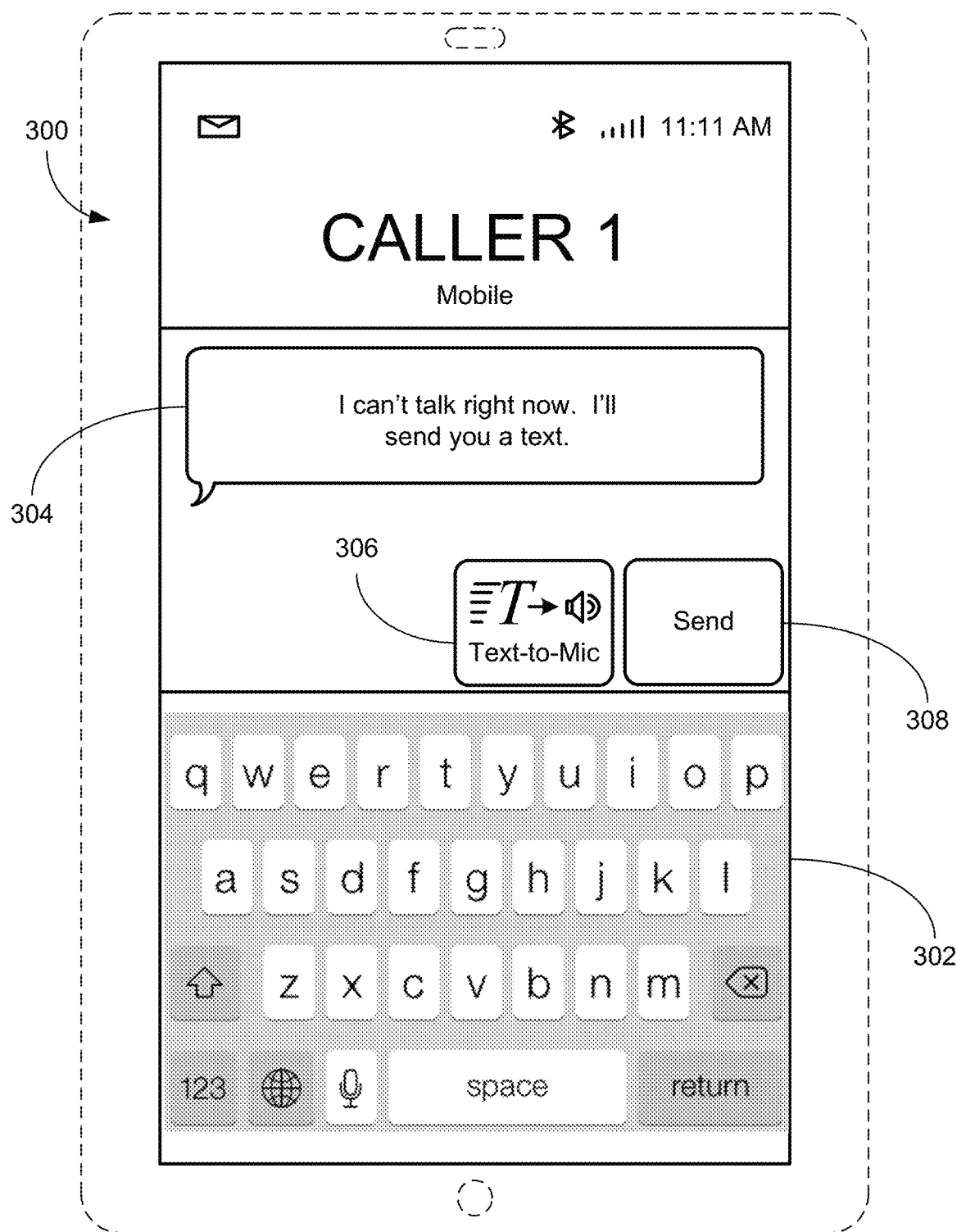
FIG. 3 depicts a custom TTM module for the GUI, in accordance with some examples of the present disclosure.

As shown in FIG. 3, when the custom TTM button 114 is selected a text GUI 300 can open. As the name implies, the custom TTM button 114 can enable the user to create a new, custom text to send to the caller when the preconfigured TTM buttons 110, 112 are not appropriate. When the custom TTM button 114 is selected, the text GUI 300 can open to provide the user with a keyboard 302, text box 304, TTM button 306, and text button 308.

As usual, the keyboard 302 can enable the user to enter text, symbols, emoticons, and other characters into the text box 304 to form a message to the caller. The text box 304 can enable the user to see and edit the message prior to sending. In this case, the text GUI 300 can include both the TTM button 306 and the text button 308.

The text button 308 can send a "conventional" text message to the caller, as opposed to a TTM message. In some examples, activating the text button 308 can also initiate another action such as, for example, disconnecting the incoming call or sending it to VM. This may be appropriate for a caller that is a friend or family member who is used to receiving text message from the user, for example. Thus, the caller may be disconnected, but receives a text message in explanation (e.g., I'm on a call, call you right back.)

The TTM button 306, on the other hand, enables the user to send a custom TTM message to the caller. Thus, the user can type a new message into the text box 304 using the keyboard 302 and then select the TTM button 306. As discussed below with reference to FIG. 6, the TTM button 306 can then send the message directly to the microphone of the UE and then to the speaker of the caller's UE. Thus, the text GUI 300 enables the user to send a custom text or TTM message, as appropriate, to the caller.

Figure 4:
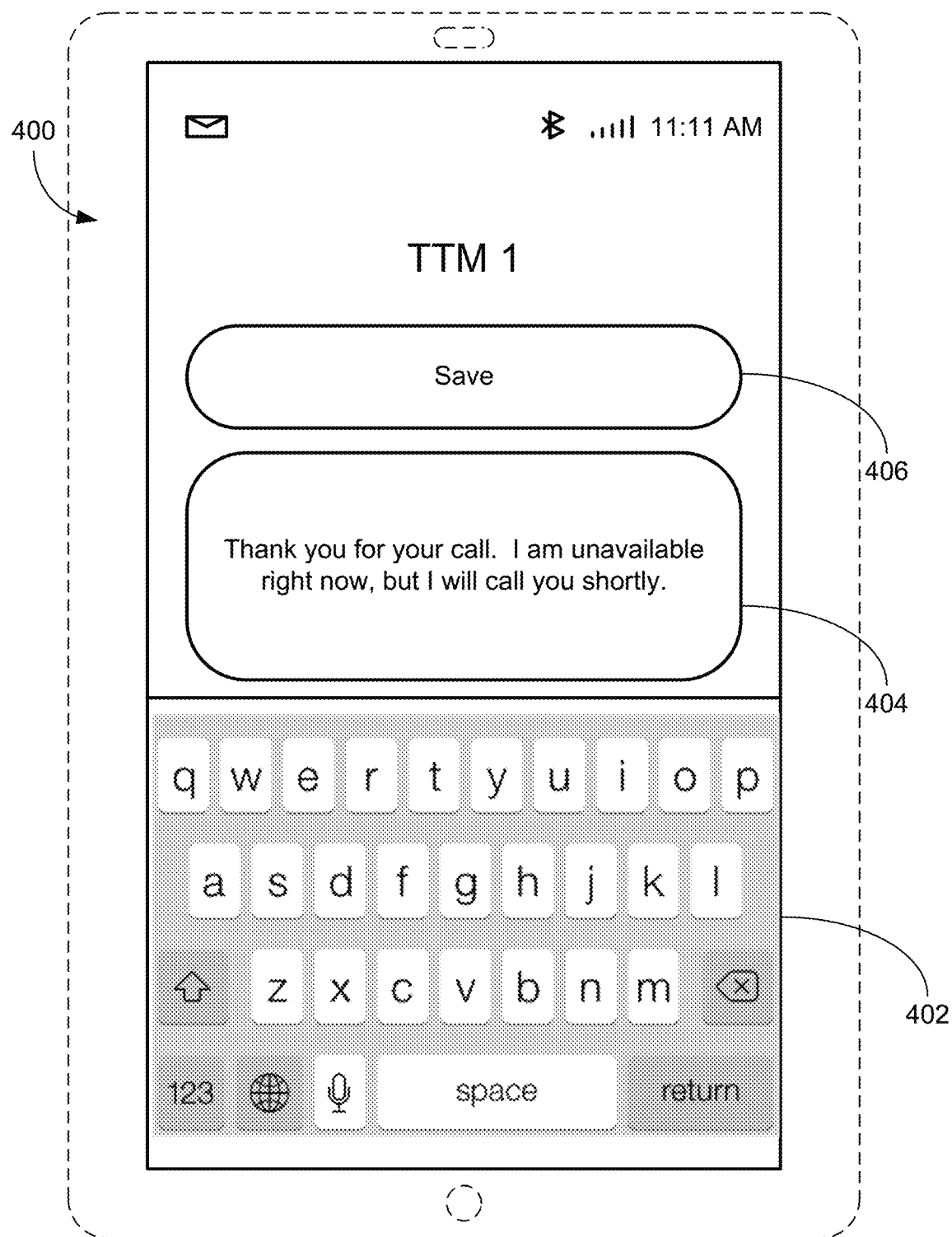
FIG. 4 depicts a new preconfigured TTM module for the GUI, in accordance with some examples of the present disclosure.

As shown in FIG. 4, the customizing module 200 can enable both the number and content of the preconfigured TTM buttons 110, 112 to be configured and updated. If the user selects the create new TTM button 208, therefore, a text interface 400 can open to enable the user to enter a new preconfigured TTM. The text interface 400 can include a keyboard 402 to enable the user to enter text, numbers, symbols, emoji, and other data. In some examples, the keyboard 402 can comprise a virtual keyboard on a touch-screen device. In other examples, the keyboard 402 can also include text-recognition to enable the user to enter data simply by speaking.

The text interface 400 can also include a text box 404 to show what is being entered and enable corrections, as necessary. The text box 404 can display text, numbers, symbols, emoji, and other data as it is being typed. In some examples, such as on a touchscreen device, the text box 404 can also enable data to be selected, copied, and pasted.

The text interface 400 can also include a TTM save button 406. When the user has entered the desired text and/or data, the user can select the TTM save button 406. In some examples, the TTM save button 406 can save the entered text message as a preconfigured TTM represented by one of the preconfigured TTM buttons 110, 112 (or a new preconfigured TTM button). In some examples, the TTM save button 406 can invoke a save dialog box, or similar, that enables the user to select to which button 110, 112 to save the TTM to, for example, or to name and save the TTM to a new button.

Similarly, the text interface 400 can assign the text message a number or address—e.g., one of the preconfigured TTM buttons 110, 112. In some examples, the number can be assigned based on the lowest available slot (in this case preconfigured TTM 3). If the current configuration of the GUI 100 includes the preconfigured TTM 1 110 and preconfigured TTM 2 112, then a subsequently entered preconfigured TTM can be assigned to preconfigured TTM 3. The TTMs can also be assigned absolute numbers or labeled in any other logical manner. In some examples, the save dialog can enable the user to name the entered text message, similar to naming a file on save in many OSs. The user may wish to save a "personal" pre-configured TTM, for example, and a "business" pre-configured TTM.

Figure 5:
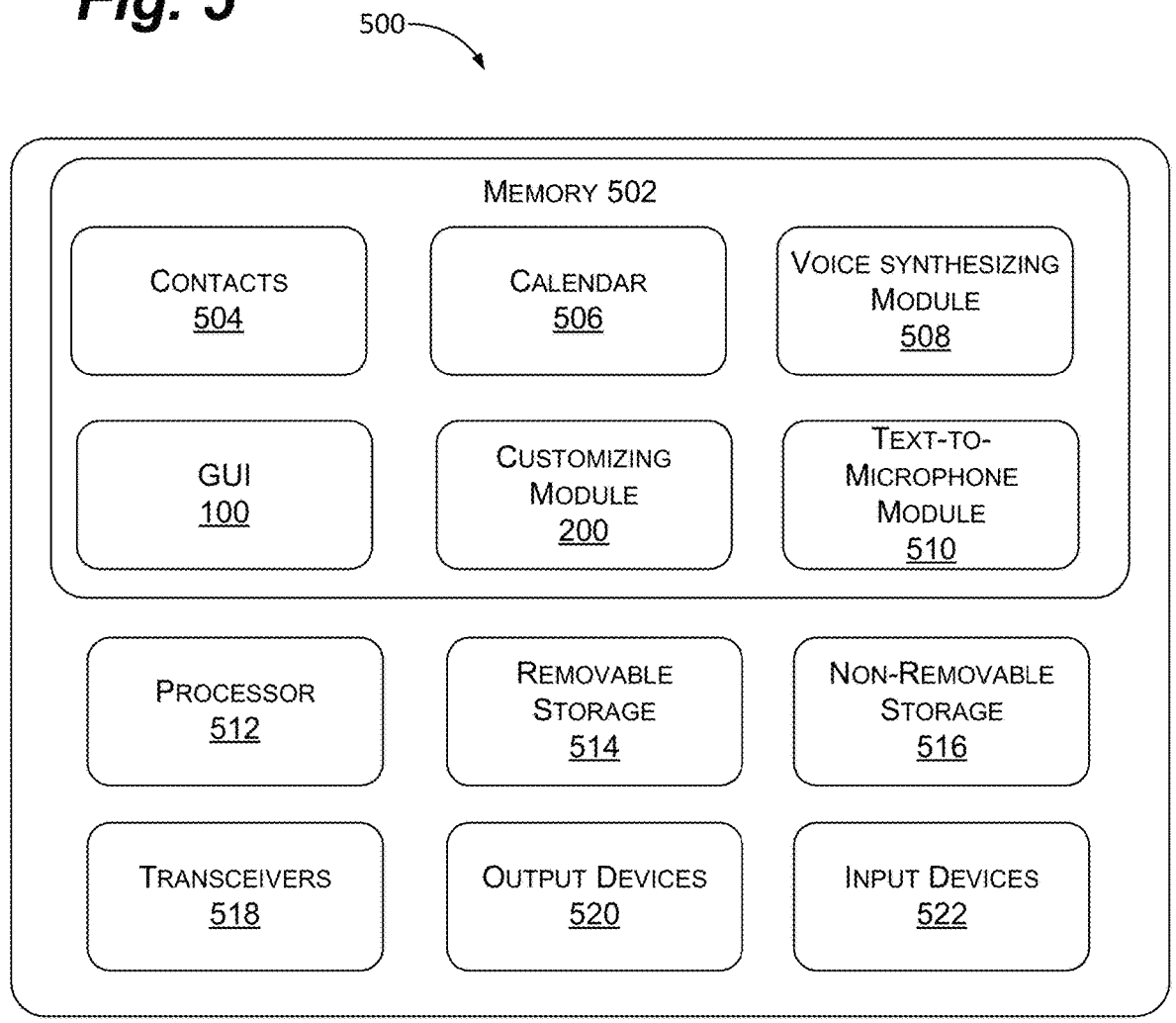
FIG. 5 is a component level schematic for a user equipment (UE) for use with the GUI, in accordance with some examples of the present disclosure.

As shown in FIG. 5, the GUI 100 can be implemented on a variety of electronic devices, such as cell phones, smart phones, tablet computers, and laptops (collectively UE 500). The UE 500 can comprise a number of components to enable the GUI 100, customization module 200 and other components to perform the above-mentioned functions. As discussed below, the UE 500 can comprise memory 502 including many common features such as, for example, the user's contacts 504 and calendar 506. In addition, the memory 502 can also include the GUI 100, the customizing module 200, a voice synthesizing module 508, and a text-to-microphone module 510. The UE 500 can also include one or more processor(s) 512, removable storage 514, non-removable storage 516, transceivers 518, output device (s) 520, and input device(s) 522. The UE 500 may additionally contain a policy engine to receive, create, transmit, and manage the various messages and commands.

In various implementations, the memory 502 can be volatile (such as RAM), non-volatile (such as ROM, flash memory, etc.), or some combination of the two. The memory 502 can also comprise contacts 504. The contacts 504 can include names, numbers, addresses, and other information about the user's business and personal acquaintances. In some examples, the memory 502 can also include a calendar, or other software, to enable the user to track appointments and calls, schedule meetings, and provide similar functions. Of course, the UE 500 can also include other software such as, for example, navigation, e-mail, text messaging, social media, and utilities (e.g., calculators, clocks, compasses, etc.).

In some examples, the memory 502 can also comprise the voice synthesizing module 508. The voice synthesizing module 508 can convert a text message selected or created by the user into an audio file, or similar. In some examples, the voice synthesizing module 508 can convert the text message into an audio file (e.g., .wav, .aac, or .mp3 file). In other examples, the voice synthesizing module 508 can convert the text message into a direct waveform representative of the text message (e.g., a waveform that causes a speaker to recreate a verbal version of the text message).

In some examples, the memory 502 can also comprise the TTM module 510. The TTM module 510 can convert the output from the voice synthesizing module 508, as necessary, to send the audio file to the microphone of the user's UE to create a TTM. In some examples, the TTM module 510 can include a digital-to-analog convertor, synthesizer, or other components to provide the necessary input to the microphone.

The UE 500 may also include additional data storage devices (removable and/or non-removable) such as, for example, magnetic disks, optical disks, or tape. Such additional storage is illustrated in FIG. 5 by removable storage 514 and non-removable storage 516. The removable storage 514 and non-removable storage 516 can store the various programs and algorithms to enable the UE 500 to be fully or partially configured and to enable the GUI 100 and customizing module 200 to present welcome screens, setup menus, and other functions to the user via the GUI 100, customizing module 200, operating system (OS), and other programs and functions.

Non-transitory computer-readable media may include volatile and nonvolatile, removable and non-removable tangible, physical media implemented in technology for storage of information, such as computer readable instructions, data structures, program modules, or other data. The memory 502, removable storage 514, and non-removable storage 516 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the UE 500. Any such non-transitory computer-readable media may be part of the UE 500 or may be a separate database or databank.

In some implementations, the transceivers 518 include any sort of transceivers known in the art. For example, the transceivers 518 may include wireless (e.g., 802.11x) and cellular (e.g., 3G, 4G, 4G LTE, etc.) communications modems. The transceivers 518 may also include wired communication components, such as a wired modem or Ethernet port, for communicating with other UEs 500 or the provider's cellular or Internet-based network. Further, the transceivers 518 may include a radio transceiver that performs the function of transmitting and receiving near-field radio frequency communications via an antenna (e.g., WiFi or Bluetooth®).

In some implementations, the output devices 520 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether a UE 500 in the system is being opened for the first time, has been configured, and/or is connected to various other services. Output devices 520 also include ports for one or more peripheral devices, such as headphones, peripheral speakers, or a peripheral display.

In various implementations, output devices 520 include any sort of input devices known in the art. For example, output devices 520 may include a camera, a microphone, a keyboard/keypad, or a touch-sensitive display. A keyboard/keypad may be a standard push button alphanumeric, multi-key keyboard (such as a conventional QWERTY keyboard), a touchscreen, or one or more other types of keys or buttons, and may also include a joystick, wheel, and/or designated navigation buttons, or the like.

In particular, the output devices 520 can include a microphone for receiving voice inputs from the user and from the TTM module 510. In this manner, the microphone can receive the audio file created by the voice synthesizing module 508 and converted by the TTM module 510. Due to the form of the TTM, the microphone does not recognize any difference between the TTM and "normal" verbal input and simply provides a signal in the normal manner.

Figure 6:
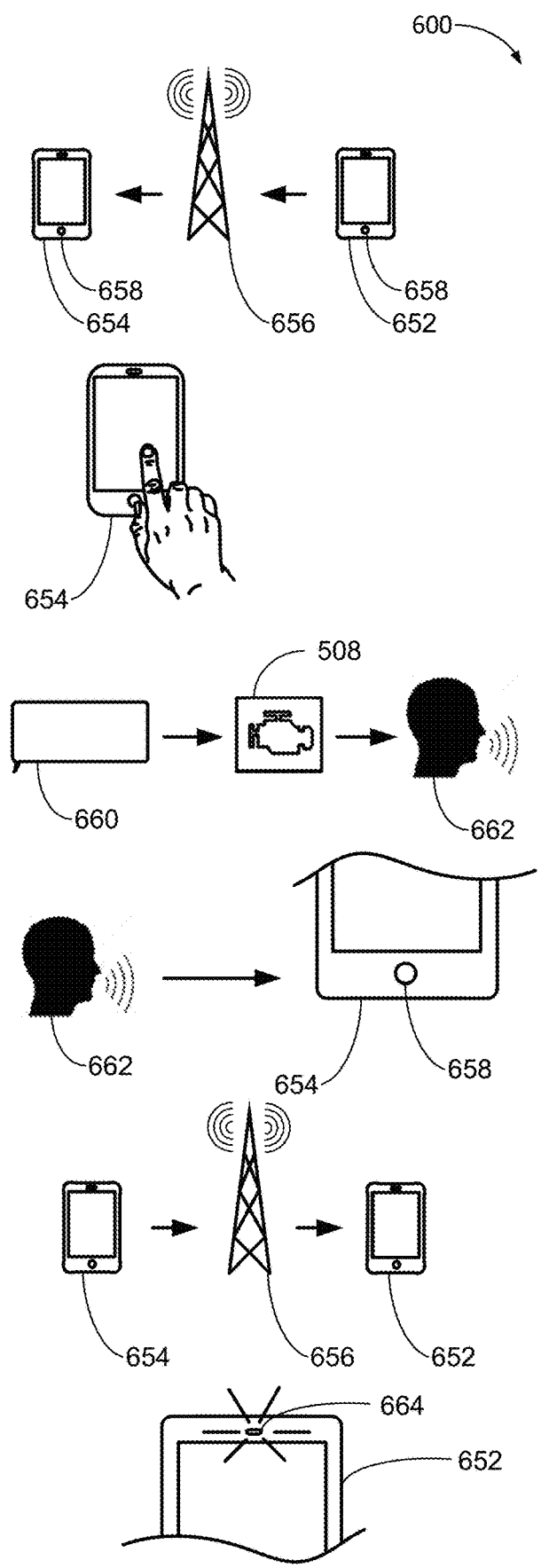
FIG. 6 is a flowchart depicting a method for receiving a call and communicating via TTM messages, in accordance with some examples of the present disclosure.
Figure 6:
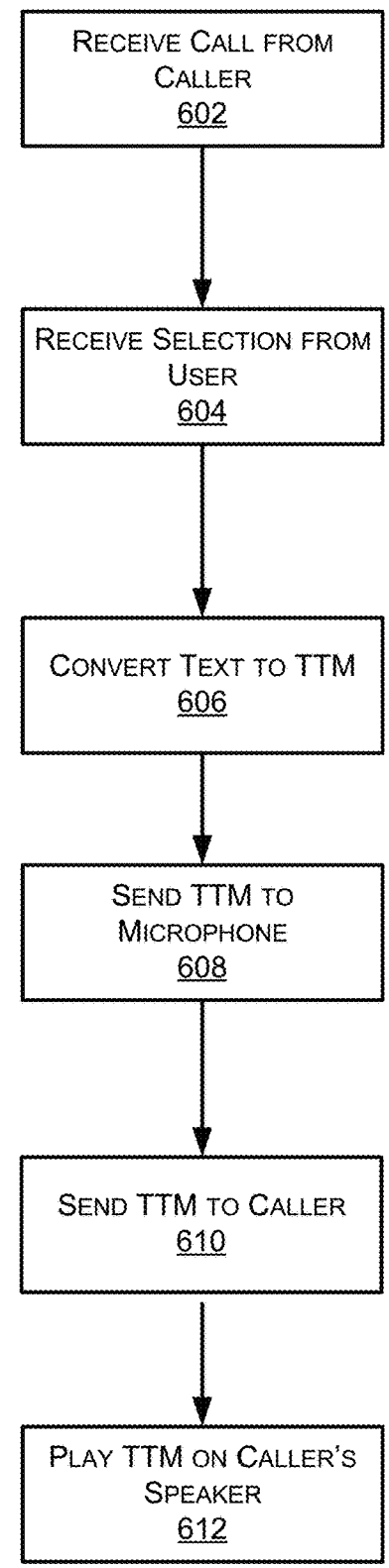

As shown in FIG. 6, examples of the present disclosure can also comprise a method 600 for responding to calls using TTM. The method 600 can enable the user to receive a voice call, but respond with a TTM. In this manner, the caller receives a verbal message, but the call remains silent. As mentioned above, this may be useful when the user is in meetings, at church, or in other environments where taking a call is difficult or inappropriate.

At 602, the user can receive a call from the caller. The caller can place a call on the caller's UE 652 to the users UE 654. The call can be placed in the normal manner, via a cell tower 656, mini-cell, micro-cell, or other suitable means, over a voice channel (e.g., voice over LTE, or VOLTE).

At 604, the user can make a selection on the user's UE 654. As mentioned above, the user's UE 654 can include many of the usual call handling features such as, for example, answering the call, sending the user to VM, or simply declining the call. In this case, however, the user can choose to respond using TTM. In some examples, selecting a TTM button 110, 112, 114 can automatically mute the microphones 658 on the user's UE 654, the caller's UE 652, or both. In this manner, the user's UE 654 can remain substantially silent during the interchange.

At 606, the user can select, or create, a text message 660 to be converted to an audio file. In some examples, the user can select one of the preconfigured TTM buttons 110, 112. In other examples, the user can select the custom TTM button 114 and enter a new text message for conversion via the keyboard 302.

Regardless of how the text message 660 is selected or created, the text message 660 can then be sent to the voice synthesizing module 508 for conversion. In some examples, as discussed above, the voice synthesizing module 508 can convert the text into an audio file 662 (e.g., .wav, .mp3, .AAC, etc.). In other examples, the voice synthesizing module 508 can create actual waveforms that cause the speaker 664 on the caller's UE 652 to play the text message verbally.

At 608, for an analog voice call, the audio file 662 can be sent directly to the microphone 658 of the user's UE 654. In this manner, a TTM is created and the audio file 662 is processed as if the user is actually speaking into the microphone 658. This prevents the user from actually having to speak into the microphone 658, however, and enables the user to remain silent, if desired.

For a voice over IP (VOIP) call, on the other hand, the microphone can be bypassed and data packets containing the TTM can be sent directly. The TTM can be inserted into real-time transfer protocol (RTP) packets, for example, for transmission via voice over LTE. In this manner, the call is still silent from the caller's perspective, however, because the packet can be sent directly from the voice synthesizing module 508, for example, to the transceiver 518.

At 610, the TTM can be sent to the caller's UE 652 in the normal manner and still over a voice channel. In this manner, the voice call remains active and the caller merely hears the TTM over the speaker 664 of the caller's UE 652 as if the user had spoken it into the user's UE 654. As mentioned above, in some examples, the caller may receive an initial message via RTT over the voice call, for example, but then switch to SMS or RCS for additional communications.

At 612, the TTM can be played over the speaker 664 of the caller's UE 652. In this manner, the caller receives a verbal message from the user over the already established voice connection, yet the user is able to remain silent. This also provides the caller with the response expected when placing a voice call—i.e., an audio response.

Figure 7:
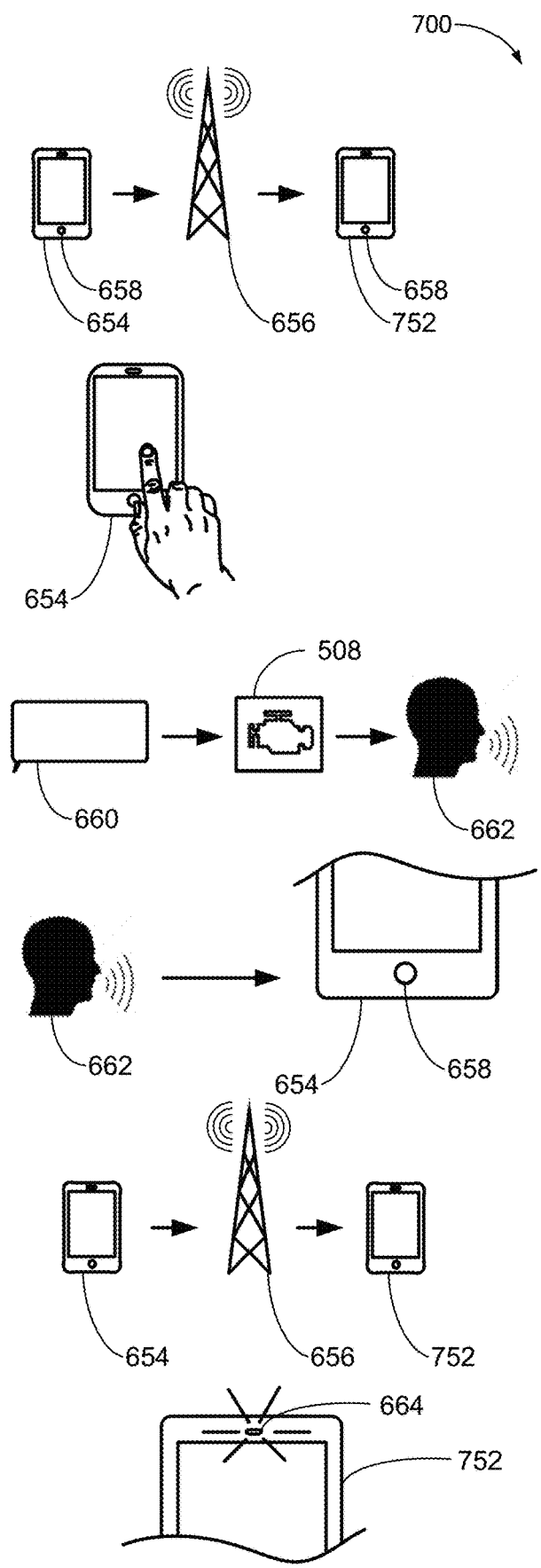
FIG. 7 is a flowchart depicting a method for placing a call and communicating via TTM messages, in accordance with some examples of the present disclosure.
Figure 7:
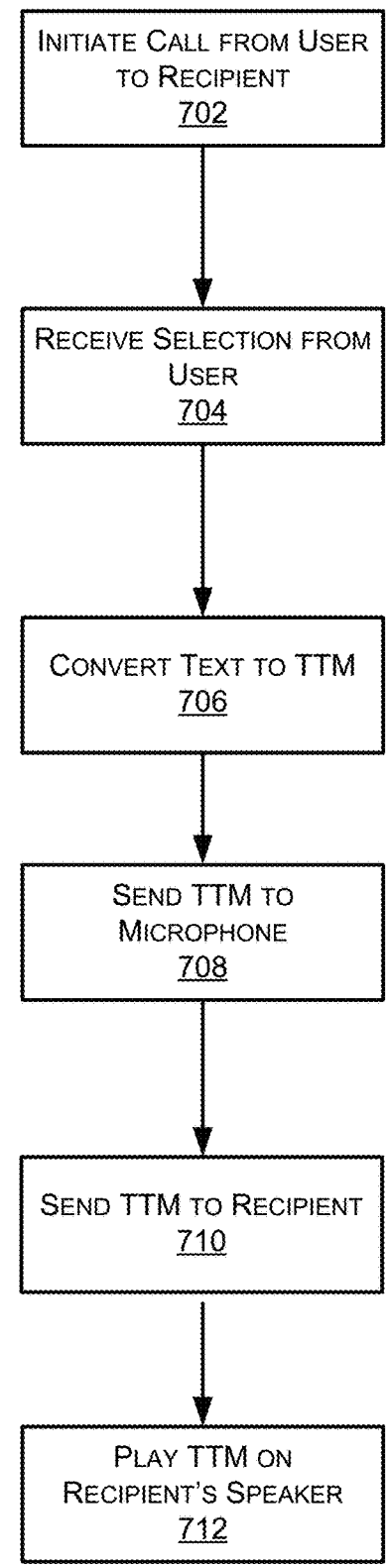

It should be noted that, while the process 600 is described above for a user receiving a call, a process 700 could also be used to place a TTM call. In other words, if the user is in a meeting, but needs to convey a message to a colleague urgently, the user can initiate a TTM call. As shown in FIG. 7, therefore, examples of the present disclosure can also comprise a method 700 for placing calls using TTM. The method 700 can enable the user to initiate a voice call, but communicate with a TTM. In this manner, the user can communicate with the recipient, but the call remains silent. As mentioned above, this may be useful when the user is in meetings, at church, or in other environments where making a call is difficult or inappropriate.

At 702, the user can place a call to the recipient. The user can place a call on the user's UE 654 to the recipient's UE 752. The call can be placed in the normal manner, via a cell tower 656, mini-cell, micro-cell, or other suitable means, over a voice channel (e.g., voice over LTE, or VOLTE). In other words, the user can place the call in the usual manner by dialing a number on the user's UE 654 or selecting a speed dial, for example, and pressing send.

At 704, the user can make a selection on the user's UE 654 to designate the call as a TTM call. In some examples, selecting a TTM button 110, 112, 114 can automatically mute the microphones 658 on the user's UE 654, the recipient's UE 752, or both. In this manner, the user's UE 654 can remain substantially silent during the interchange even though the user placed the call.

At 706, the user can select, or create, a text message 660 to be converted to an audio file. In some examples, the user can select one of the preconfigured TTM buttons 110, 112. In other examples, the user can select the custom TTM button 114 and enter a new text message for conversion via the keyboard 302. The user can create a text that says, for example, "I am in a meeting right now and can't talk, but I though you should know (X) right away."

In some cases, because the recipient may not be aware that they are receiving a TTM call, the TTM can be provided to the recipient immediately upon answering the call. In other words, the user can enter, or select, the contents of a text message on the user's UE 654 prior to placing the call. The user can then select a "place TTM call button," or similar, to place the call. In this manner, the TTM can be provided to the recipient's UE 752 immediately and/or automatically upon the recipient answering the call. This can avoid any confusion caused by a delay between when the recipient answers the call and when the TTM is received on the recipient's UE 752.

Regardless of how the text message 660 is selected or created, the text message 660 can then be sent to the voice synthesizing module 508 for conversion. In some examples, as discussed above, the voice synthesizing module 508 can convert the text into an audio file 662 (e.g., .wav, .mp3, .AAC, etc.). In other examples, the voice synthesizing module 508 can create actual waveforms that cause the speaker 664 on the recipient's UE 752 to play the text message verbally. In still other embodiments, the voice synthesizing module 508 can convert the text directly into a data packet, such as an RTP packet to be sent to the recipient's UE 752.

At 708, for an analog voice call, the audio file 662 can be sent directly to the microphone 658 of the user's UE 654. In this manner, a TTM is created and the audio file 662 is processed as if the user is actually speaking into the microphone 658. This prevents the user from actually having to speak into the microphone 658, however, and enables the user to remain silent, if desired.

For a voice over IP (VOIP) call, on the other hand, the microphone 658 can be bypassed and data packets containing the TTM can be sent directly to the recipient's UE 752. The TTM can be inserted into real-time transfer protocol (RTP) packets, for example, for transmission via voice over LTE. In this manner, the call is still silent from the user's perspective, however, because the packet can be sent directly from the voice synthesizing module 508, for example, to the transceiver 518 of the user's UE 654 and then to the recipient's UE 752.

At 710, the TTM can be sent to the recipient's UE 752 in the normal manner and still over a voice channel. In this manner, the voice call remains active and the recipient merely hears the TTM over the speaker 664 of the recipient's UE 752 as if the user had spoken it into the user's UE 654. As mentioned above, in some examples, the recipient may receive an initial message via RTT over the voice call, for example, but then switch to SMS or RCS for additional communications.

At 712, the TTM can be played over the speaker 664 of the recipient's UE 752. In this manner, the recipient receives a verbal message from the user over the already established voice connection, yet the user is able to remain silent. In this configuration, the user is able to place a call to the recipient and impart information to the recipient, while remaining silent.

Regardless of whether the user is answering or placing a TTM call, it can be useful for the TTM to be accompanied by a standard text message. In other words, in some examples, at the same time (or nearly the same time) the TTM is transmitted from the user's UE 654 to the caller's UE 652 or recipient's UE 752, the user's UE 654 can also transmit a standard "text message"—e.g., a short messaging service (SMS) or multimedia messaging service (MMS) message. In this manner, at the same time (or nearly the same time) that the TTM is being played in the speaker 664 of the caller's UE 652 or recipient's UE 752, a text message with the same contents can also appear on the screen. This may help reduce the confusion of the caller or recipient and provides redundant communications.

In still other examples, a text message can arrive before the TTM call to alert the recipient that a TTM call is on the way. In other words, prior to placing a TTM call, the system 100 or the user can send a text message saying, "You have an incoming TTM call." The recipient can then answer the incoming call forewarned that it is a TTM call. In this manner, the recipient knows what to expect and to listen for a TTM message, rather than saying "Hello?" or being otherwise confused.

While several possible examples are disclosed above, examples of the present disclosure are not so limited. For instance, while a systems and methods for use with various electronic equipment has been disclosed, the system could be used on electronic equipment not mentioned, or other types of equipment without departing from the spirit of the disclosure. In addition, the location and configuration used for various features of examples of the present disclosure such as, for example, the order of steps, the components of the GUI 100, or customizing module 200, can be varied according to a particular device, touchscreen or OS that requires a slight variation due to, for example, the size or construction of the device, power or battery constraints, or accessibility concerns. Such changes are intended to be embraced within the scope of this disclosure.

The specific configurations, methods, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
   receiving, over a voice over long term evolution (VOLTE) channel, a call at a transceiver of a first user equipment (UE) of a user from a second UE of a caller;
   receiving, by an input device of the first UE, a selection of a text-to-microphone (TTM) button;
   in response to the selection of the TTM button, sending, by the transceiver of the first UE over the VOLTE channel, a signal to cause the caller's UE to mute a microphone of the second UE;
   sending contents of a text message to a voice synthesizing module of the first UE;
   converting, by the voice synthesizing module, the contents of the text message into an audio file;
   generating, by a TTM module of the first UE, a TTM message comprising the audio file;
   sending, by the transceiver of the first UE over the VOLTE channel, the TTM message to the second UE; and
   sending, by the transceiver of the first UE, the text message to the second UE,
   wherein the TTM message causes a speaker on the second UE to play the audio file, and
   wherein sending the text message causes a screen on the second UE to display the text message.

2. The method of claim 1, wherein, in response to the selection of the TTM button, a processor of the first UE mutes a microphone of the first UE.

3. The method of claim 1, wherein receiving the selection of the TTM button comprises receiving the selection of a preconfigured TTM button; and
   wherein the contents of the text message are stored in a memory of the first UE.

4. The method of claim 1, wherein receiving the selection of the TTM button comprises receiving the selection of a custom TTM button, the method further comprising:
   opening a text box in response to receiving the selection of the custom TTM button; and
   receiving the contents of the text message via one or more input devices on the first UE, and
   wherein the one or more input devices of the first UE comprise a touchscreen keyboard, the microphone, or both.

5. The method of claim 1, further comprising:
   inserting the TTM message into one or more real-time transfer protocol (RTP) packets,
   wherein sending, by the transceiver over the VOLTE channel, the TTM message to the second UE comprises transmitting the one or more RTP packets over the VOLTE channel.

6. The method of claim 1, the call being a first call, the TTM message being a first TTM message, the method further comprising:
   initiating, by the first UE, a second call to the second UE by transmitting, by the transceiver, a second TTM message to the second UE.

7. The method of claim 1, wherein receiving the selection of the TTM button comprises receiving, by the input device, a selection of a preconfigured TTM button, and
   wherein the text message comprises a preconfigured text message corresponding to the preconfigured TTM button.

8. The method of claim 1, wherein the text message is transmitted to the second UE before the TTM message is transmitted to the second UE.

9. The method of claim 1, wherein the text message is transmitted to the second UE simultaneously as the TTM message is transmitted to the second UE.

10. The method of claim 1, wherein the text message is transmitted over a short messaging service (SMS) channel that is different than the VOLTE channel.

11. A first user equipment (UE) comprising:
    a display configured to display a graphical user interface (GUI) comprising at least a plurality of buttons associated with a plurality of call-handling actions to a user, the plurality of buttons comprising at least one text-to-microphone (TTM) button;
    one or more input devices to receive an input from the user;

a transceiver to receive, over a voice to long term evolution (VOLTE) channel, a call from a second UE;
one or more processors in communication with at least the display, the transceiver, and the one or input devices; and
memory including at least a voice synthesizing module and a TTM module, the memory storing computer-executable instructions that, when executed, cause the one or more processors to:
identify a selection of a text-to-microphone (TTM) button based on the input from the user;
in response to the selection of the TTM button, sending, by the transceiver, a signal to cause the second UE to mute a microphone of the second UE;
convert, by the voice synthesizing module, the contents of a text message into an audio file; and
generate a TTM message that comprises the audio file;
send, by the transceiver over the VOLTE channel, the TTM message to the second UE; and
send, by the transceiver, the text message to the second UE,
wherein the TTM message causes a speaker on the second UE to play the audio file.

12. The first UE of claim 11, the input being a first input, wherein the one or more input devices are further configured to receive a second input from the user, and
wherein the computer-executable instructions further cause the one or more processors to:
identify a selection of a customize button based on the second input; and
open a customizing module comprising one or more additional function buttons, the customizing module enabling the user to customize the GUI.

13. The first UE of claim 12, the input being a first input, wherein the one or more input devices are further configured to receive a second input, a third input, and a fourth input from the user,
wherein the computer-executable instructions further cause the one or more processors to:
identify a selection of a new TTM button based on the second input, the GUI comprising the new TTM button;
open a text box in response to identifying the selection of the new TTM button;
identify the contents of the text message based on the third input;
identify a selection of a save button based on the fourth input, the GUI comprising the save button; and
store the text message as a new preconfigured TTM message, and
wherein the new preconfigured TTM message is associated with a preconfigured TTM button, the GUI comprising the new preconfigured TTM message.

14. The first UE of claim 13, wherein the one or more input devices comprise a touchscreen keyboard on the display.

15. The first UE of claim 11, wherein the computer-executable instructions that, when executed, further cause the one or more processors to insert the TTM message into one or more real-time transfer protocol (RTP) packets, and
wherein sending the TTM message to the second UE comprises transmitting, by the transceiver over the VOLTE channel, the RTP packets to the second UE.

16. A method performed by a first user equipment (UE), the method comprising:
receiving, by a transceiver over a voice over long term evolution (VOLTE) channel, a call from a second UE;
receiving, by an input device, a selection of a text-to-microphone (TTM) button;
receiving, by the input device, a text message;
generating, by one or more processors, an audio file based on the text message;
generating, by the one or more processors, one or more real-time transfer protocol (RTP) packets based on the audio file; and
transmitting, by the transceiver over the VOLTE channel, the one or more RTP packets to the second UE.

17. The method of claim 16, wherein the one or more RTP packets are one or more first RTP packets, the method further comprising:
generating one or more second RTP packets based on the text message; and
transmitting, by the transceiver, the one or more second RTP packets to the second UE.

18. The method of claim 17, wherein the one or more second RTP packets comprise at least one of a short messaging service (SMS) message, a multimedia messaging service (MMS) message, or a rich communication services (RCS) message.

19. The method of claim 17, wherein the one or more second RTP packets are transmitted to the second UE before the one or more first RTP packets are transmitted to the second UE.

* * * * *